July 29, 1952     E. W. PITZER     2,605,235
REACTIVATION OF AN ALUMINA-METAL OXIDE CATALYST
Filed Jan. 4, 1949
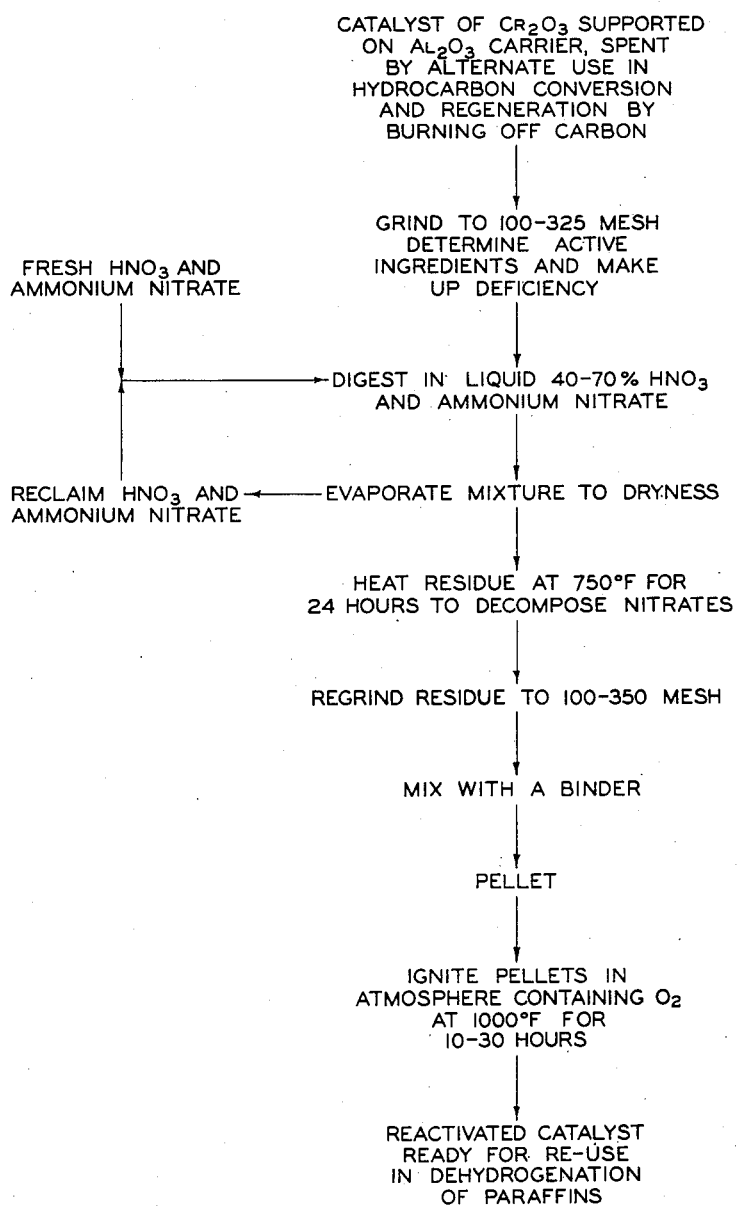
INVENTOR.
E. W. PITZER.
BY *Hudson 3rd Young*
ATTORNEYS Patented July 29, 1952

2,605,235

UNITED STATES PATENT OFFICE 2,605,235

REACTIVATION OF AN ALUMINA-METAL OXIDE CATALYST

Emory W. Pitzer, Bartlesville, Okla., assignor to Phillips Petroleum Company, a corporation of Delaware Application January 4, 1949, Serial No. 69,085

15 Claims. (Cl. 252—413)

This invention relates to the reactivation of spent alumina-heavy metal oxide catalysts. A specific aspect of the invention relates to the reactivation of alumina-metal oxide catalysts which have become spent by prolonged use in the conversion of hydrocarbons, including hydrogenation and dehydrogenation reactions, particularly the dehydrogenation of paraffins to less saturated aliphatic hydrocarbons, such as olefins and diolefins, with periodic regeneration with an oxygen-containing gas to remove the carbon deposited thereon during the conversion portion of the cycle and burning off said carbon with oxygen.

Alumina-heavy metal oxide catalysts such as mixtures of alumina and chromium oxide, and alumina-chromium oxide-magnesium oxide, as well as composites of this nature in which molybdenum, tungsten, uranium, manganese and vanadium oxides are substituted for, or incorporated in addition to the chromium oxide, are utilized in hydrocarbon conversion processes, particularly in hydrogenation and dehydrogenation reactions. In composites of this nature, the alumina may be considered the carrier on which the other oxide or oxides are deposited, or the catalysts may be simply mixtures of these oxides. A common commercial use of such catalysts is in the conversion of normal butane to normal butylenes and butadiene by contacting the butane with an alumina-chromia-magnesia catalyst (typically containing 12 weight per cent $Cr_2O_3$, 2 weight per cent MgO, and 86 weight per cent $Al_2O_3$) at a temperature of about 1000 to 1200° F. and a space velocity of about 500 to 1000 gaseous volumes of normal butane (STP) per volume of catalyst per hour. Carbon is deposited on the catalyst during the reaction and subsequently removed by contact with an oxygen-containing regeneration gas at an elevated temperature. Commercial operation often comprises alternate dehydrogenation and regeneration periods of about one hour each.

It has been proposed in my application Serial No. 717,958, filed December 23, 1946, now Pat. No. 2,585,033, to reactivate such a deactivated catalyst by comminuting the catalyst pellets to a fineness of 150–325 mesh, digest the finely divided catalyst in nitric acid, evaporate to dryness, heating the dry mixture to a temperature of about 750° F. to decompose the nitrates, recomminuting the dry material, pilling the comminuted catalyst, and igniting the pills in oxygen-containing gas at 600° to 1000° F. for an extended period.

This invention is concerned with the reactivation of spent alumina-heavy metal oxide catalysts by a method which substantially completely restores the original activity of the catalyst and, in some cases, produces a restored catalyst of a higher activity than the original catalyst.

The principal object of the present invention is to provide a simple and practical method of reactivating catalysts of the alumina-chromia type, which have become deactivated by prolonged use. Another object is to provide such a method for the reactivation of catalysts of the alumina-chromia type which contain an added metal oxide modifier. Another object of the invention is to provide a reactivation method of the foregoing type which is easily carried out and restores substantially the original activity of the catalyst. It is also an object of the invention to provide reactivated catalysts of high activity. Other objects of the invention will become apparent from the accompanying disclosure.

The accompanying drawing is a flow diagram of a typical method of reactivating an alumina-chromia catalyst in accordance with the present invention and is self-explanatory in the light of the present specification.

I have now found that alumina-chromium oxide type catalysts spent by alternate conversion and regeneration with an oxygen-containing gas so as to remove carbon deposited thereon during the hydrocarbon conversion can be reactivated by grinding or otherwise comminuting the spent catalyst, digesting the finely divided catalyst with nitric acid and ammonium nitrate in the presence of excess liquid, evaporating the resulting mixture to dryness, heating the residue to decompose the nitrates, forming the resulting material into uniformly shaped bodies, and igniting these bodies. If the catalyst is to be used in a fluidized catalyst process, the step of forming the finely divided material into pellets or bodies may be omitted.

I prefer to grind the spent catalyst to a particle size in the range of 100 to 325 mesh size;

digest the ground material at an elevated temperature, preferably at the boiling temperature of the liquid mixture of nitric acid and ammonium nitrate, for from about 1 to about 50 hours; evaporate the mixture to dryness; heat the residue to a temperature in the range of 500° to 1000° F., and preferably 750° F., usually from 2 to 30 hours, until the nitrates formed during the digestion are converted to the oxides and any ammonium nitrate is volatilized; form an extrudable or compactable mix of the residue with a suitable volatile, organic binder; pellet or otherwise compact the mix into uniform bodies; and ignite the pellets or bodies in an oxygen-containing atmosphere at a temperature of 600° to 1000° F. for a sufficient time, usually 10 to 30 hours, to remove the binder.

I have found that as little as 5 per cent nitric acid or 5 per cent ammonium nitrate in the digestion mixture is sufficient to effect substantial improvement in the activity of the reactivated catalyst if a sufficient amount of one of the constituents is used to provide excess liquid at the beginning of the digestion step. If about equal weights of catalyst and one of the digestion constituents are mixed, as little as 5 per cent of the other constituent effects substantial increase in the activity of the reactivated catalyst. Thus, digestion of the catalyst with 5 weight per cent nitric acid and 100 weight per cent ammonium nitrate, or 5 weight per cent ammonium nitrate and 100 weight per cent nitric acid, based on the weight of the comminuted catalyst, substantially restores the original activity of the catalytic material. However, the incorporation of an amount of both the ammonium nitrate and the nitric acid in amounts equivalent to the weight of the catalyst material to be reactivated and, preferably, as much as 2 or 3 times the weight of the catalyst, is preferred in order to produce a reactivated catalyst which is more active than the original catalyst. The use of nitric acid of at least 40 per cent concentration is preferred, although less concentrated acid in larger quantities may be used. The weights of nitric acid referred to hereinabove are based upon the use of 70 per cent acid which is the preferred strength to use, although even more concentrated acid may be used if desired.

Another modification of the invention comprises incorporating additional metal oxide in the digestion mixture so as to raise the catalytic metal oxide content of the final composite to that of the original composition, or, if desired, to a higher content than that of the original mixture. For example, it is found that after repeated deactivation and reactivation of an alumina-chromia catalyst, the chromia content gradually decreases and the restoration of the chromia to its original proportion in the catalyst when combined with the reactivation treatment of the invention more than restores the original activity of the catalyst complex. The metal oxide may be added to the digestion mixture in any suitable form which is readily converted to the nitrate or the oxide during the course of treatment of the catalyst. In the case of chromia, a convenient method is to add sufficient chromic acid or chromium trioxide to the digestion mixture. However, a metal salt readily convertible to the oxide upon heating may be added to the mixture before the pelleting step with beneficial results.

The digestion step involves heating the mixture of comminuted catalyst, nitric acid, and ammonium nitrate in the presence of excess liquid, preferably for a period of 5 to 50 hours, although digesting for a period of one hour effects an improvement in the activity of the reactivated catalyst. It is usually desirable to digest the mixture under total reflux for a period of about 40 hours to effect the maximum improvement in the catalytic material. Digestion for longer periods than 50 hours, while effecting no appreciable improvement in the catalyst, is not found to be detrimental thereto and is not outside the scope of the invention. The digestion may also be performed by boiling the mixture without reflux by periodically adding water and/or nitric acid thereto.

After digesting the mixture for a sufficient period, the water and volatile material are driven off by heating so as to dry the mixture. It is found that 750° F. is the preferred temperature for heating the residue to convert the salts formed during the digestion to the corresponding oxides, but any other temperature between about 500° F. and 1000° F. will perform this function with only slightly less desirable results. The material should be heated at a temperature within this range until the nitrates are converted to oxides and any volatile material present is driven off. At a temperature of 750° F., a period of 24 hours has been found sufficient to completely convert the nitrates to oxides and eliminate any volatile material present.

After the heating step, it is desirable to again finely divide the catalyst mixture by grinding or other suitable means either prior to or simultaneously with admixing of a suitable binder to prepare the catalyst for pelleting or compacting into small cylindrical, spherical, or other uniformly shaped bodies. Any of the conventional binders used in pelleting catalysts are satisfactory. It has been found that Sterotex (hydrogenated peanut oil) is one of the most satisfactory binders for pelleting the catalyst mixture. Other binders which may be used are artificial and synthetic resins, aluminum stearate, stearic acid, molasses, and other volatile organic materials which do not deleteriously affect the catalyst and which are readily removed upon calcination of the compacted pellets. Only a small amount of binder, just sufficient to hold the catalytic material together after pelleting, is required. Usually, from about 3 to 15 per cent based on the weight of the catalyst is sufficient. The mixture of catalyst and binder may be extruded in either a piston or auger type extrusion press, with or without deairing of the feed, or compacted in a conventional tableting machine. Of course, if the catalytic material is to be used in finely divided form, such as in a fluidized catalyst process, the pelleting step may be omitted. After the forming step, ignition or calcination at a temperature of about 100° F. until the binder is removed, say from 10 to 30 hours, produces a hard, porous, and durable pill or pellet which is suitable for use in catalyst beds at high temperatures.

While the present invention is particularly applicable to paraffin dehydrogenation catalysts of the alumina-chromia type, i. e., comprising a minor proportion of chromium oxide supported on a major proportion of alumina as a carrier, it may be applied to the reactivation of other alumina-metal oxide catalysts. Other metal oxides to which the invention is applicable are the oxides of molybdenum, tungsten, uranium, vanadium, titanium, manganese, etc. In general, these oxides may be characterized as difficultly reducible heavy metal oxides affecting the carbon to hydrogen linkage of a hydrocarbon molecule.

The invention is applicable to the reactivation of catalysts, including the foregoing metal oxides, in combination with any of the conventional alumina materials incorporated in catalysts and especially to the alumina known as active alumina made by partially dehydrating the trihydrate or monohydrate or a mixture of the two hydrates, including the so-called "Activated Alumina" of commerce which is well known in the catalyst art, and calcined bauxite which is believed to be a mixture of the mono- and trihydrates of alumina.

The alumina-heavy metal oxide catalyst which may be reactivated in accordance with the present invention may also contain in addition to the heavy metal oxide, such as chromia, small amounts of other materials which may be found to be beneficial to the catalyst. Examples of these materials are metal oxide modifiers such as magnesium oxide and beryllium oxide. Occasionally, small amounts of alkali metal oxides or alkaline earth metal oxides may also be found in the type catalysts to which the invention is applicable. The function of the modifier such as magnesium or beryllium oxide in the catalyst may be to stabilize the alumina in the desirable gamma form thereby preventing or delaying its gradual conversion to the less active alpha form. The alkali or alkaline earth metal oxides may increase the life of the catalyst as by reducing carbon deposition and, in general, may increase the effectiveness of the catalyst. It is within the scope of the invention to regulate the content of these metal oxide modifiers during the reactivation of the catalyst, such as by increasing their proportion in the catalyst or by the original addition of the same to the catalyst complex during the digestion period or during the grinding and mixing with the binder, the former method being preferred.

Catalyst treated or reactivated in accordance with the invention may be used for any of the usual processes for which these catalysts of the alumina-chromia or alumina-chromia-magnesia type are found to be active. They are particularly useful in the commercial catalytic paraffin dehydrogenation process wherein normal butane is dehydrogenated to normal butylenes and butadiene.

The following examples illustrate typical methods of carrying out catalyst reactivation in accordance with the invention and the degree of success of the process in restoring the original activity of the catalyst.

*Example I*

A catalyst that had been deactivated as a result of continuous use for about 175 days, in alternate one-hour reaction and carbon removal periods, in a commercial plant in which normal butane was dehydrogenated to obtain normal butenes and butadiene, had approximately the following composition: 17 weight per cent chromia, 3 weight per cent magnesia, and 80 weight per cent alumina. This catalyst was made by impregnating pills of activated alumina with a solution of chromic acid and magnesium nitrate followed by ignition.

The deactivated catalyst was ground to about 325 mesh size, mixed and boiled under total reflux with 70 per cent nitric acid equivalent to about 3 times the weight of the catalyst and ammonium nitrate equivalent to about 2 times the weight of the catalyst. After boiling for 44 hours, the mixture was heated to vaporize the nitric acid and ammonium nitrate and the residue was heated at 750° F. for 24 hours, cooled, mixed with 10 weight per cent Sterotex (hydrogenated peanut oil), ground in a hammer mill to pass a 100-mesh sieve, pilled, and heated to remove the Sterotex from the pills.

The reactivated catalyst was tested at 1050° F. and 750 space velocity and the activity was compared to that of deactivated and new catalysts. The following data was obtained:

Catalyst: Activity[1], mol percent
  Deactivated _____ 15.4
  Reclaimed, reactivated _____ 35.9
  New _____ 29.0

[1] Activity = per cent of butane converted to n-butenes and butadiene.

These data show that the catalyst reactivation process produced a catalyst with a higher initial activity than the initial activity of new catalyst.

*Example II*

A catalyst that had been deactivated as a result of continuous use for about 269 days, in alternate one-hour reaction and carbon removal periods, in a commercial plant in which normal butane was dehydrogenated to obtain normal butenes and butadiene, had approximately the following composition: 20 weight per cent chromia and 80 weight per cent alumina. The catalyst was made by impregnating pills of activated alumina with a solution of chromic acid followed by ignition.

The deactivated catalyst was treated in the same manner as set forth in Example I, paragraph 2.

The reactivated catalyst was tested at 1050° F. and 750 space velocity and the activity was compared to that of deactivated and new catalysts. The following data was obtained:

Catalyst: Activity[1], weight per cent
  Deactivated _____ 17.9
  Reactivated _____ 36.3
  New _____ 34.0

[1] Activity = per cent of butane converted to n-butenes and butadiene.

These data also show that this catalyst reactivation process produced a catalyst with a higher initial activity than the initial activity of new catalyst.

*Example III*

A catalyst that has been deactivated as a result of continuous use for about 175 days, in alternate one-hour reaction and carbon removal periods, in which normal butane is dehydrogenated to obtain normal butenes and butadiene has an original composition of 20 weight per cent chromia and 80 weight per cent alumina. This catalyst was made by impregnating pills of activated alumina with a solution of chromic acid followed by ignition.

The deactivated catalyst is treated in the same manner as set forth in Example I, paragraph 2.

Following the initial reactivation, the catalyst is alternately deactivated and subsequently reactivated in substantially the same manner as described above. After the fifth deactivation period, the chromia content of the catalyst has decreased to 18.5 weight per cent. During these five periods of continuous use, the chromia content of the catalyst shows a decrease of 1.5 percentage points, possibly as a result of vaporization since chromia is found in the heavy fraction of the reaction product. Some of this material is reactivated as described above and tested at 1050° F. and 750 space velocity and the data are shown in the tabulation below.

The composition of another portion of the deactivated catalyst, which is found to contain only 18.5 weight per cent chromia, is adjusted to the initial composition—20 weight per cent chromia, 80 weight per cent alumina—by the addition of chromic acid. This catalyst is reactivated as described above and the reactivated catalyst is tested at 1050° F. and 750 space velocity.

The activities of the deactivated, reactivated, reactivated with composition adjusted, and new catalysts show the effect of chromia content on catalyst activity.

| Catalyst: | Activity[1], weight per cent |
|---|---|
| Deactivated (18.5 weight per cent chromia) | 14.3 |
| Reactivated (18.5 weight per cent chromia) | 31.6 |
| Reactivated (20.0 weight per cent chromia) | 35.4 |
| New (20.0 weight per cent chromia) | 34.0 |

[1] Activity = per cent butane converted to n-butenes and butadiene.

The catalyst reactivated without adjusting the composition to the original ratio has a lower activity than the new catalyst. When the composition is adjusted to the original ratio, the activity slightly exceeds the activity of new catalyst. In general, this example indicates that replacing the active catalyst material which has been lost during extended use, followed by digestion in nitric acid and ammonium nitrate, will restore all of the catalyst activity lost during extended use.

These improvements in the catalyst reactivation process increase the extent of catalyst reactivation from 50 to 100 per cent. They also provide a process whereby a catalyst can be reactivated and reused a number of times by replacing the active ingredient(s) lost during extended use.

Certain modifications of the invention will become apparent to those skilled in the art and the illustrative details disclosed are not to be construed as imposing unnecessary limitations on the invention.

I claim:

1. A process for reactivating a spent catalyst comprising alumina and a difficultly reducible heavy metal oxide, which comprises finely comminuting the spent catalyst; digesting the comminuted catalyst with a mixture of ammonium nitrate and nitric acid for a period between 1 and 50 hours so as to extract at least a portion of said metal oxide; evaporating the resulting mixture to dryness; heating the residue at a temperature in the range of 500° to 1000° F. so as to convert to the oxide any metal nitrate formed during digestion; and comminuting the resulting material.

2. A process for reactivating a spent catalyst comprising alumina and a difficultly reducible heavy metal oxide capable of affecting the hydrogen linkage of a hydrocarbon molecule, which comprises finely comminuting the spent catalyst; digesting the comminuted catalyst with at least 5 weight per cent nitric acid of at least 40 per cent concentration and at least 5 weight per cent ammonium nitrate, the total amount of digestive agents being sufficient to provide excess liquid at least at the beginning of the digestion for a period of at least one hour and until at least a portion of the metal oxide is extracted; evaporating the digested mixture to dryness; heating the residue at a temperature in the range of 500 to 1000° F. so as to convert to the oxide the metal nitrate formed during digestion; and comminuting the resulting material.

3. The process of claim 2 in which the comminuted resulting material is formed into pellets with a volatile, organic binder and the pellets are ignited in an oxygen-containing gas so as to remove the binder.

4. The process of claim 2 in which the difficultly reducible heavy metal oxide is chromium oxide.

5. The process of claim 2 in which additional difficultly reducible heavy metal oxide is incorporated in the digestion mixture.

6. A process for reactivating a spent catalyst comprising alumina and chromium oxide which comprises comminuting the spent catalyst to a particle size in the range of 100 to 325 mesh; digesting the comminuted catalyst for a period of at least an hour with at least an equal weight of nitric acid of at least 40 per cent concentration and at least an equal weight of ammonium nitrate so as to extract at least a portion of the chromium oxide; evaporating the resulting mixture to dryness; heating the residue at a temperature in the range of 500 to 1000° F. so as to convert to the oxide the chromium nitrate formed during digestion; comminuting the resulting material to the aforesaid particle size; mixing the comminuted material with a volatile organic binder; forming the mixture into regularly shaped bodies; and igniting said bodies in an oxygen-containing atmosphere so as to remove the binder.

7. The process of claim 6 in which chromium is converted in the form of a compound to the oxide by the treatment of the process.

8. A process for reactivating a spent catalyst comprising alumina, chromium oxide, and a metal oxide modifier selected from the group consisting of magnesium oxide and beryllium oxide, which comprises finely comminuting the spent catalyst; digesting the comminuted catalyst with at least 5 weight per cent nitric acid of at least 40 per cent concentration and at least 5 weight per cent ammonium nitrate, the total amount of digestion agents being sufficient to provide excess liquid at least at the beginning of the digestion, for at least one hour and until a portion of the metal oxides is extracted; evaporating the resulting mixture to dryness; heating the residue at a temperature in the range of 500 to 1000° F. so as to convert to the oxides any metal nitrate formed during digestion; mixing the resulting material in finely comminuted form with a volatile, organic binder; forming the mixture into regularly shaped bodies; and igniting said bodies in an oxygen-containing atmosphere so as to remove said binder.

9. The process of claim 8 in which the modifier is magnesium oxide.

10. The process of claim 8 in which the modifier is beryllium oxide.

11. The reactivated alumina-difficultly reducible metal oxide catalyst made by the process of claim 1.

12. The reactivated alumina-chromium oxide catalyst made by the process of claim 6.

13. The reactivated catalyst made by the process of claim 8 consisting essentially of alumina-chromium oxide, and a metal oxide modifier selected from the group consisting of magnesium oxide and beryllium oxide.

14. The reactivated catalyst of claim 13 in which the metal oxide modifier is magnesium oxide.

15. The reactivated catalyst of claim 13 in which the metal oxide modifier is beryllium oxide.

EMORY W. PITZER.

REFERENCES CITED

The following references are of record in the file of this patent:

UNITED STATES PATENTS

| Number | Name | Date |
| --- | --- | --- |
| 1,446,984 | Midgley | Feb. 27, 1923 |
| 2,211,208 | Ipatieff et al. | Aug. 13, 1940 |
| 2,411,829 | Huffman | Nov. 26, 1946 |